July 9, 1963 W. L. MORRISON 3,096,626
METHOD OF CHILLING, STORING AND SHIPPING PERISHABLE MATERIALS
Filed Feb. 27, 1956
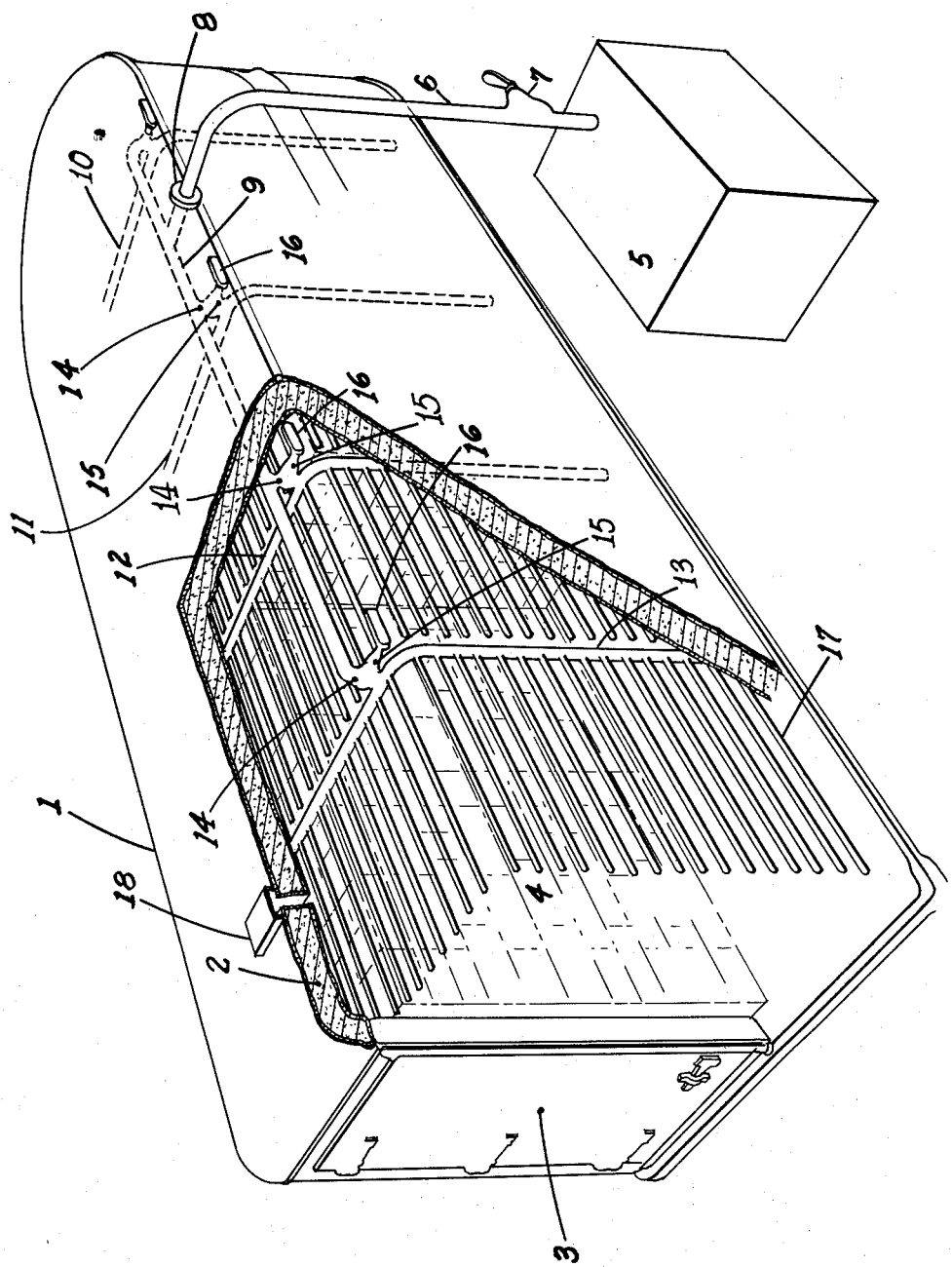
INVENTOR.
WILLARD L. MORRISON
BY PARKER & CARTER
ATTORNEYS

United States Patent Office 3,096,626
Patented July 9, 1963

3,096,626
METHOD OF CHILLING, STORING AND SHIPPING PERISHABLE MATERIALS
Willard L. Morrison, Lake Forest, Ill., assignor, by mesne assignments, to Liquefreeze Company, Inc., New York, N.Y., a corporation of New York
Filed Feb. 27, 1956, Ser. No. 567,850
1 Claim. (Cl. 62—60)

My invention relates to an improvement in method of and apparatus for chilling, storing and shipping such perishable materials as foodstuffs.

One object of my invention is to provide a practicable commercially useful, relatively foolproof apparatus and method for shipping, storing during shipment and delivering frozen foodstuffs assembled in, for example a truck body, to permit the delivery at a number of successive stops of the frozen foodstuffs without refrigeration enroute and without danger of excessive loss of refrigeration.

Frozen foods should be delivered at point of use at a temperature far below freezing so that even if delay ensues after delivery before the foodstuffs are placed in the grocer's freezer, the temperature of the foodstuffs will remain far below freezing.

In many instances, it has been found that frozen foodstuffs loaded into an insulated truck, discharged on the receiving dock of the grocery store, reach temperatures in the order of 30° before there is time to get them into the grocer's freezer. Even though the foodstuffs may not rise to freezing, they are still badly damaged and subsequent reduction in temperature will not overcome the difficulty.

When the foodstuffs, all at safely low temperature, far below zero in an insulated truck or trailer body, are to be delivered to a number of points, each opening of the loading door at back or side of the truck for removal of the packages allows the cold air to spill out and be replaced by ambient warm air. When the door is shut, the entrapped warm air tends to raise the temperature of the remainder of the contents. At each stop, the same thing happens so that as the body is gradually unloaded the temperature of the contents gradually rises. In order to insure a safe low temperature for the last delivery, it is necessary to cool the entire mass to a point far below that necessary to protect the earlier increments of delivery. This is uneconomical because if the later deliveries are cold enough, the earlier deliveries, are colder than necessary. Cooling is expensive and excessive cooling of the earlier deliveries is wasteful.

I propose to compensate for this situation by associating with a truck body, means for differentially cooling the contents after it has been loaded so that the increments to be later discharged from the body will be colder than those increments intended for earlier unloading.

One convenient method of accomplishing this is illustrated in the accompanying drawing, wherein—

A truck body 1, insulated at 2 having insulated rear opening doors 3 contains a multiplicity of packages 4 of frozen foodstuffs.

The tank 5 which may contain liquid nitrogen at a temperature of approximately —328° F. The means for supplying the nitrogen form no part of my present invention and are not illustrated. The hose 6 controlled by a valve 7 is adapted to discharge the liquid from the tank 5 through a removable coupling 8 to a supply main 9 which except for the end associated with the coupling 8 is contained within the truck body.

A plurality of manifolds 10, 11, 12, 13 within the truck body and each adapted to receive liquid nitrogen from the main 9, through a duct 14 controlled by a valve 15, there being one valve for each manifold. The valve control mechanisms 16 are located outside of the body so that the valves 15 may be manipulated from outside while the body is closed.

Each manifold supplies a plurality of foraminous tubes 17, when the liquid enters the manifold, it is discharged into the interior of the truck through the foraminous walls of the tubes 17, comes into intimate contact with the relatively warm foodstuffs in the truck body.

The food packages will be placed in the truck body at perhaps 0° F. or lower but because they are much warmer than the liquid (i.e. —380° F.) the latent heat necessary to cause the liquid to boil will be supplied by the contents of the truck as the packages are chilled to a temperature far below the truck loading temperature.

With all the valves open, the liquid will be supplied generally uniformly to the entire contents of the truck.

A pressure relief valve 18 permits escape of the gas boiled from the liquid to atmosphere or if desired, gas may be withdrawn through it from the vehicle for further use or reliquefaction, the details form no part of the present invention and are therefore not illustrated.

In order to achieve the desired differential cooling, the operator will close the valve associated with the manifold 13 nearest the door. Thus the packages for earliest delivery will receive less cold liquid and so will remain at a higher temperature than the increments further forward. The operator will then close the valve associated with manifold 12 and then 11 and then 10 and this result in a progressive cooling of the contents of the truck with the forward portion of the contents being of progressively lower temperatures from the rear unloading door to the front of the storage and shipment chamber.

When the truck makes its first stop, the rearmost increment will be discharged from the truck at a sufficiently low temperature. The truck door is then closed. When the next successive stops are made, successive increments will be discharged. As the total heat content of the truck rises owing to penetration of ambient heat through insulation and owing to the successive openings of the door, the material being discharged at each successive stop, having started at a lower temperature than the previous discharge will still remain at a sufficiently low temperature for safety.

It is known in advance as the load is made up what packages are to be discharged at each stop, approximately how much time will lapse between the chilling of the contents of the truck and the discharge of each successive increment. It is also known how long the door is liable to be open for each unloading stop. Thus it is possible to estimate the heat inflow with sufficient accuracy to decide what temperature ought to prevail within the various portions of the box in order to insure that at the end of the run when the last discharge is made, the last shipment will be cold enough and the earlier discharges will be cold enough but not too cold.

The control may as indicated be effected manually, the operator at the loading point being instructed how long to leave each successive valve open. If desired, thermocouples may be planted in the truck body and the operator may be instructed to turn off each successive manifold when the temperature associated with it reaches the desired point. Or automatic temperature control means may be provided, their details forming no part of the present invention whereby when the temperature in that part of the body containing each increment reaches the desired low point the supply of liquid will be automatically cut off.

Any suitable mechanisms as above indicated may be provided for this purpose. The essential requirement is that as the truck starts out on its route, the temperatures of the batches of material intended for successive unloading are decreased in consonance with the time during which they are to remain in the truck before unloading.

I have illustrated my invention with the use of liquid nitrogen as the coolant. Other cold boiling liquids could be used and in fact under some circumstances other means of cooling might be adopted. The advantage of the use of the cold boiling liquid in this connection is that the cold boiling liquid extracting the latent heat from the material gives exceptionally rapid cooling so that the truck or shipper container body needs to be tied up only a short time after it has been loaded.

It is important to be sure that the temperature of the various parts of the contents be adjusted in consonance with the desired temperature of delivery or in consonance with the length of time which will elapse from the start of the trip or the start of the storage period until the particular part of the contents is removed because under normal operating conditions, no adjustment needs to be or will be made for refrigerating or cooling en route.

I prefer to pack into the container frozen food from any suitable food freezing plant but my invention may under some circumstances be applied to the packaging, shipment and storage of unfrozen food, that is, food above 32° F. Under these circumstances, if the food is of a type that can or should be frozen, the entire freezing process may take place in the container.

On the other hand, if the foodstuffs are of the kind which are to be shipped chilled but not frozen, the temperature of the various batches will be brought down to points above freezing but in proportion to or in correlation with the time it is expected that the batches will remain in the container so that the batch last to be unloaded will even though longer exposed to warming, be at a sufficiently low temperature.

While I have illustrated a trailer truck body it is obvious that a truck itself with the usual engine, wheels, etc. might be used and since neither the truck nor the trailer transport details form part of the present invention, I have not illustrated the propulsion mechanism.

I claim:

The method of preparing for delivery and delivering successive batches of perishable food which consists in packing all the batches at substantially uniform temperature in an insulated shipper container in the inverse order of their expected time of delivery, then closing the container and while it is closed and before shipment, selectively cooling the successive batches of food to temperatures in consonance with their time of expected delivery, the temperatures progressively decreasing in the order of their time of expected delivery, then without further cooling, conveying the container to the first point of delivery, opening it and removing the first batch of food, then closing the container and conveying it to the next point of delivery, opening it and removing the next batch of goods and continuing such step by step conveying, opening, delivery and closing until all the batches have been delivered.

References Cited in the file of this patent
UNITED STATES PATENTS

| | | |
|---|---|---|
| 966,076 | Bobrick | Aug. 2, 1910 |
| 1,923,451 | Miller | Aug. 22, 1933 |
| 2,140,744 | Hirsch | Dec. 20, 1938 |
| 2,200,465 | Brelsford et al. | May 14, 1940 |
| 2,353,909 | Lager | July 18, 1944 |
| 2,513,355 | Peckinpaugh | July 4, 1950 |
| 2,618,939 | Morrison | Nov. 25, 1952 |
| 2,791,102 | Kleist | May 7, 1957 |